United States Patent
Fong et al.

(10) Patent No.: US 11,201,958 B2
(45) Date of Patent: *Dec. 14, 2021

(54) ALTERNATIVE TRANSPORT IN DATA COMMUNICATION FOR MOBILE DEVICE

(71) Applicant: PPIP LLC, Tempe, AZ (US)

(72) Inventors: Michael Fong, Chandler, AZ (US);
Neric Hsin-wu Fong, Tempe, AZ (US);
Mohamad Ahmad Foustok, Parkland, FL (US)

(73) Assignee: PPIP, LLC, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,387

(22) Filed: Jan. 20, 2020

(65) Prior Publication Data

US 2021/0227070 A1 Jul. 22, 2021

(51) Int. Cl.
*H04W 12/033* (2021.01)
*H04M 1/72409* (2021.01)

(52) U.S. Cl.
CPC ..... *H04M 1/72409* (2021.01); *H04W 12/033* (2021.01)

(58) Field of Classification Search
CPC ....... H04W 4/80; H04W 12/06; H04W 84/18; H04W 8/005; H04W 84/12; H04W 24/08; H04W 28/0883; H04W 12/009; H04W 88/08; H04W 12/00; H04W 12/43; H04W 12/50; H04W 88/085; H04W 12/033; H04W 8/18; H04W 76/10; H04W 8/22; H04W 72/1215; H04W 76/15; H04W 76/18; H04M 1/72409; H04M 1/72412; H04M 1/725; H04M 1/6041; H04M 1/6075; H04M 19/047; H04M 1/04; H04M 1/23; H04M 1/72527; H04M 1/72552; H04M 1/667; H04M 1/72505; H04M 1/72577; H04M 1/727; H04M 11/06; H04M 1/6083; H04M 1/6091; H04M 1/72519; H04M 1/7253; H04M 1/7255; H04M 1/72558;
(Continued)

(56) References Cited

U.S. PATENT DOCUMENTS

| | | | |
|---|---|---|---|
| 6,542,735 B1 * | 4/2003 | Carley | H04M 1/725 455/411 |
| 9,178,976 B2 * | 11/2015 | Djordjevic | G06F 1/1626 |
| 10,203,964 B2 * | 2/2019 | Johnnie | G06F 9/4411 |

(Continued)

FOREIGN PATENT DOCUMENTS

WO  WO-2011139795 A1 * 11/2011 ............ H04W 48/18

*Primary Examiner* — Lana N Le
(74) *Attorney, Agent, or Firm* — Fernando & Partners, LLP

(57) ABSTRACT

In accordance with some embodiments, an apparatus and methods for providing alternative communications are provided. The apparatus may include a housing arranged to hold a personal communication device. The apparatus may provide an additional communication path for the personal communication device which was previously not there. In some embodiments, an additional communication mechanism may be provided for a newer telecommunication standard or form of communication. In another embodiment, an added close proximity data communication device may be provided, which enables a personal communication device to perform in close proximity standards that it otherwise may not be able to.

20 Claims, 8 Drawing Sheets

(58) Field of Classification Search
CPC .. H04M 2250/02; H04M 11/00; G06F 1/1632
USPC .......................... 455/556.1, 556.2, 557–558
See application file for complete search history.

(56) References Cited

U.S. PATENT DOCUMENTS

| | | | |
|---|---|---|---|
| 10,743,179 B2* | 8/2020 | Totzke | H04M 1/72409 |
| 2005/0186953 A1* | 8/2005 | Harris | H04M 1/04 |
| | | | 455/419 |
| 2005/0283314 A1* | 12/2005 | Hall | A01C 21/007 |
| | | | 702/2 |
| 2009/0023475 A1* | 1/2009 | Chang | H04M 1/72409 |
| | | | 455/557 |
| 2013/0167196 A1* | 6/2013 | Spencer | H04W 12/06 |
| | | | 455/411 |
| 2016/0173361 A1* | 6/2016 | Somasundaram | H04W 24/08 |
| | | | 370/328 |
| 2019/0335332 A1* | 10/2019 | Ying | H04W 12/71 |
| 2020/0053007 A1* | 2/2020 | Slevinsky | H04L 45/745 |
| 2020/0103934 A1* | 4/2020 | Steffen | H04L 63/0853 |
| 2020/0112844 A1* | 4/2020 | Greenberg | H04W 84/18 |
| 2020/0372789 A1* | 11/2020 | Norris | H04W 8/005 |
| 2020/0380622 A1* | 12/2020 | Videnovic | H04W 4/80 |
| 2021/0051758 A1* | 2/2021 | Xu | H04W 76/38 |

\* cited by examiner

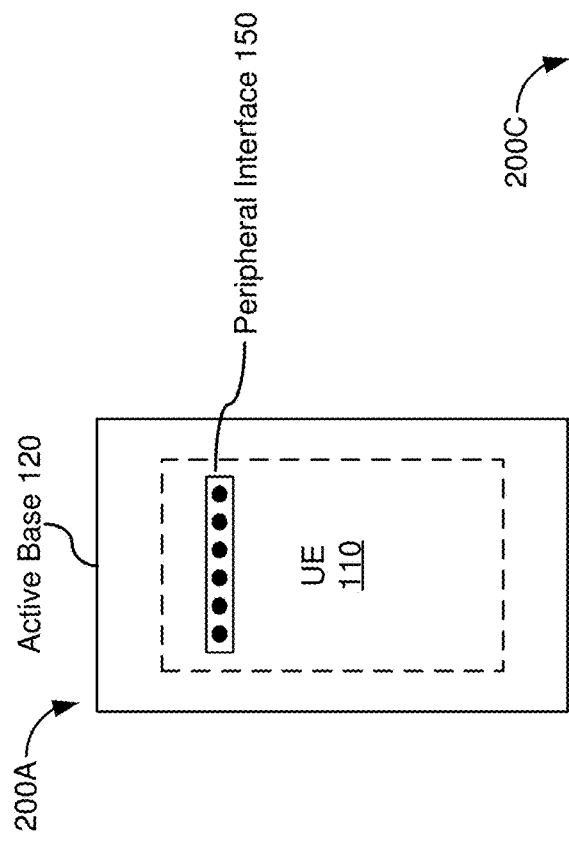
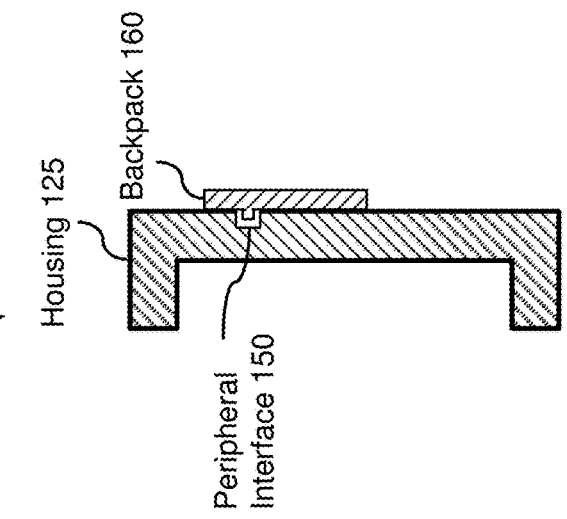
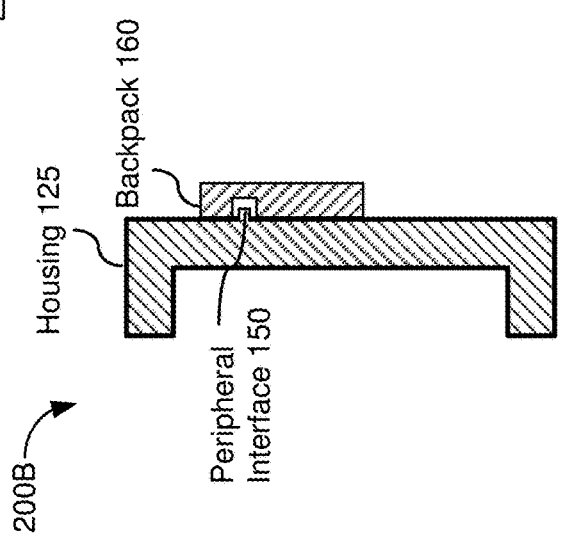

ALTERNATIVE TRANSPORT IN DATA COMMUNICATION FOR MOBILE DEVICE

TECHNICAL FIELD

This relates generally to the field of mobile device communication, and more specifically to an apparatus for enabling alternative data communication transport for mobile devices.

BACKGROUND

Smartphones typically have radios for local and/or remote communications. For example, smartphones may include a cellular radio for communicating remotely with a base station. Similarly, they may include a near field communication (NFC) radio, a WiFi radio, and/or a Bluetooth radio for pairing with another device nearby. Users, however, are not upgrading their smartphones and mobile devices as often as before. Processors and display capabilities are not advancing at the rate they used to. As a result, users are often satisfied with their hardware for longer periods of time. In contrast, network infrastructure and telecommunications systems are being constantly updated with newer technologies and standards. Older mobile devices, such as cellphones, may have the video and audio capabilities that satisfy a user, while not being able to provide the newer telecommunication standards capabilities.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 2A-2C are illustrations of exemplary peripheral interfaces connectable to the apparatus in accordance with some embodiments;

Figure 1:
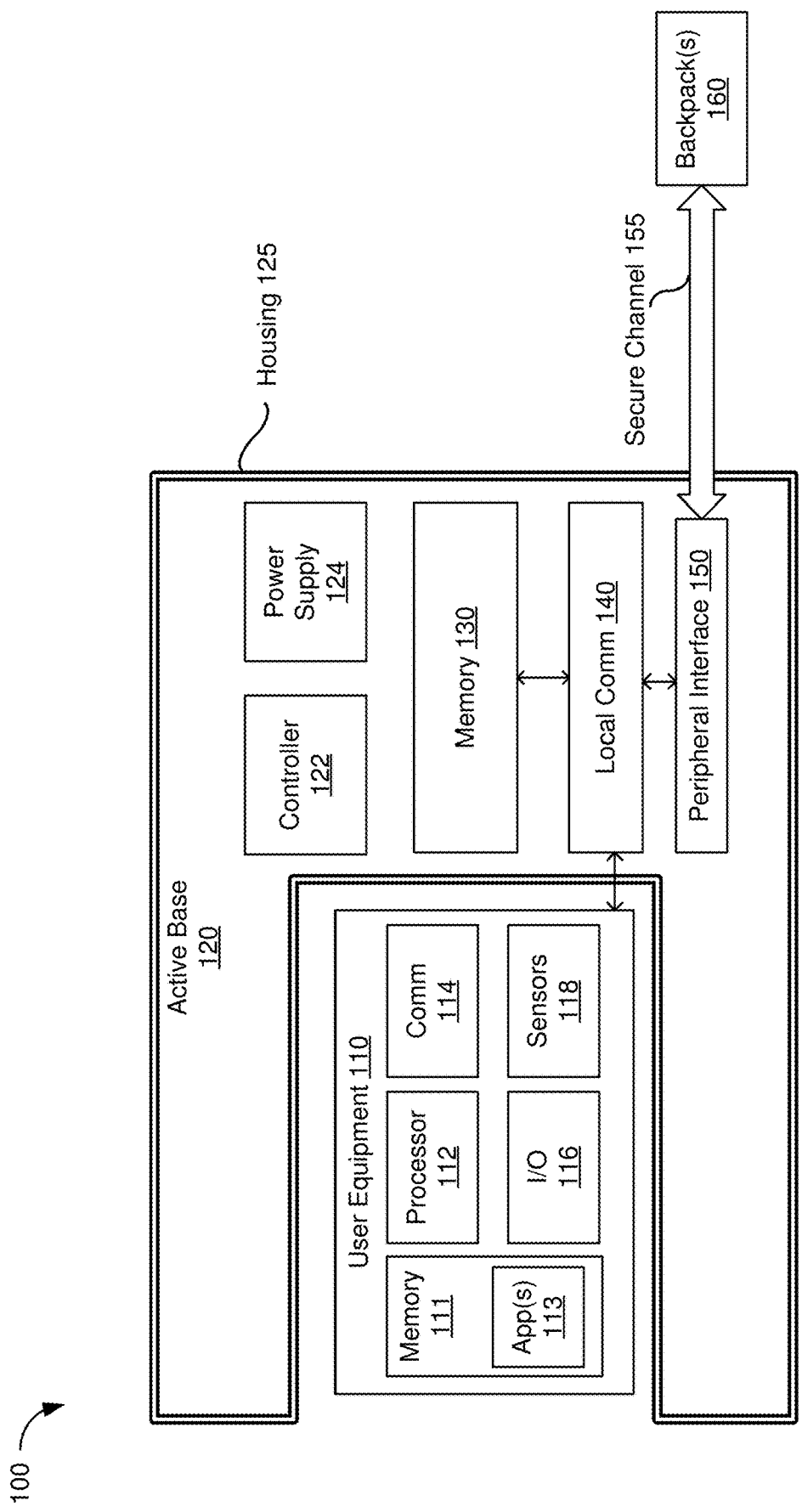
FIG. 1 is a block diagram of an exemplary apparatus holding a personal communication device in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

There exists a need to provide a more flexible way for users to use their mobile devices on newer standards or technologies without upgrading their devices. Described herein is an apparatus (e.g., a first device) for providing one or more mechanisms of alternative transport for data communications with a mobile device (e.g., a second device). The apparatus may be directly connected, attached, or wirelessly-connected to the second device, e.g., a cellphone for communication. The apparatus may provide capability of one or more communication methods, such as newer wireless standards, satellite communication, local international standards or services as well as close proximity data communications.

For example, the apparatus may provide Fifth Generation (5G) capability to a Long-Term Evolution (LTE) capable phone (e.g., the second device). In another example, an auxiliary device (e.g., a third device) may be attached to the apparatus which provides the alternative data communication transport. In some embodiments, a user may connect or mate the apparatus to the second device (e.g., the user's cellular phone) and be able to communicate (e.g., using their regular phone number) in a location or country outside their standard service zone. For example, a user from the United States may travel to Europe and plugin the apparatus described herein and be able to use their user equipment from the United States (and/or phone number from the United States) in Europe through the apparatus mated with the cellular phone.

In some embodiments, the apparatus may be a smart case or an active base, for providing alternative data communication transport methods of a personal communication device such as a smartphone, a wearable device, or a tablet, for example. The apparatus may have remote communication devices that include one or more integrated circuits which provide alternative data transport communications methods or standards. The remote communication device may send and receive radio packets or communication which enables capabilities that the personal communication device may not have. The apparatus may also have an interface that is connectable to a supplemental functional device (for example, a backpack attached to the apparatus).

The supplemental functional device is operable to pair with the personal communication device and provides supplemental functionalities to the personal communication device. For example, the supplemental functional device can provide telecommunication capability such as 5G, satellite communications, Bluetooth Low Energy (BLE), or amateur radio capability. The additional communication capabilities can be used to conveniently add capabilities to the personal communication device. The apparatus in accordance with embodiments described herein thus is particularly useful for newer communications or telecommunications standards and allows more efficient use of mobile devices.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an apparatus 120 (also referred to as an active base 120) holding a personal communication device 110 (also referred to as a User Equipment (UE) 110) is depicted, in accordance with some embodiments. Different from a conventional base or case that merely holds a personal communication device, the active base 120 actively communicates with, monitors, and analyzes the personal communication device 110 in order to determine whether the personal communication device 110 is a compromised device and to provide alternate methods of data communications.

In some embodiments, the memory 130 includes one or more memory devices, including fixed and/or removable memory devices. In some embodiments, the memory 130 provides a non-transitory computer-readable storage medium for storing computer program instructions (e.g., the application(s) 113) to be executed by the processor 112. In some embodiments, the memory 130 exchanges information with a local communication device 140, a remote communication device (not pictured), or the peripheral interface 150.

In some embodiments, the active base 120 includes a housing 125 arranged to hold the personal communication device 110 (e.g., smartphone, wearable, tablet, etc.). In some embodiments, the housing 125 includes a plurality of components mateable with one another. In other words, the plurality of components, once mated with one another, form an assembly to hold and/or provide structural support of the personal communication device 110. The housing 125 allows a user to insert the personal communication device 110 into the active base 120 for more protection of work-related sensitive information (e.g., in a work mode) or take the personal communication device 110 out of the active base 120 for less monitoring of the personal communication by enterprise (e.g., in a personal mode).

Figure 3:
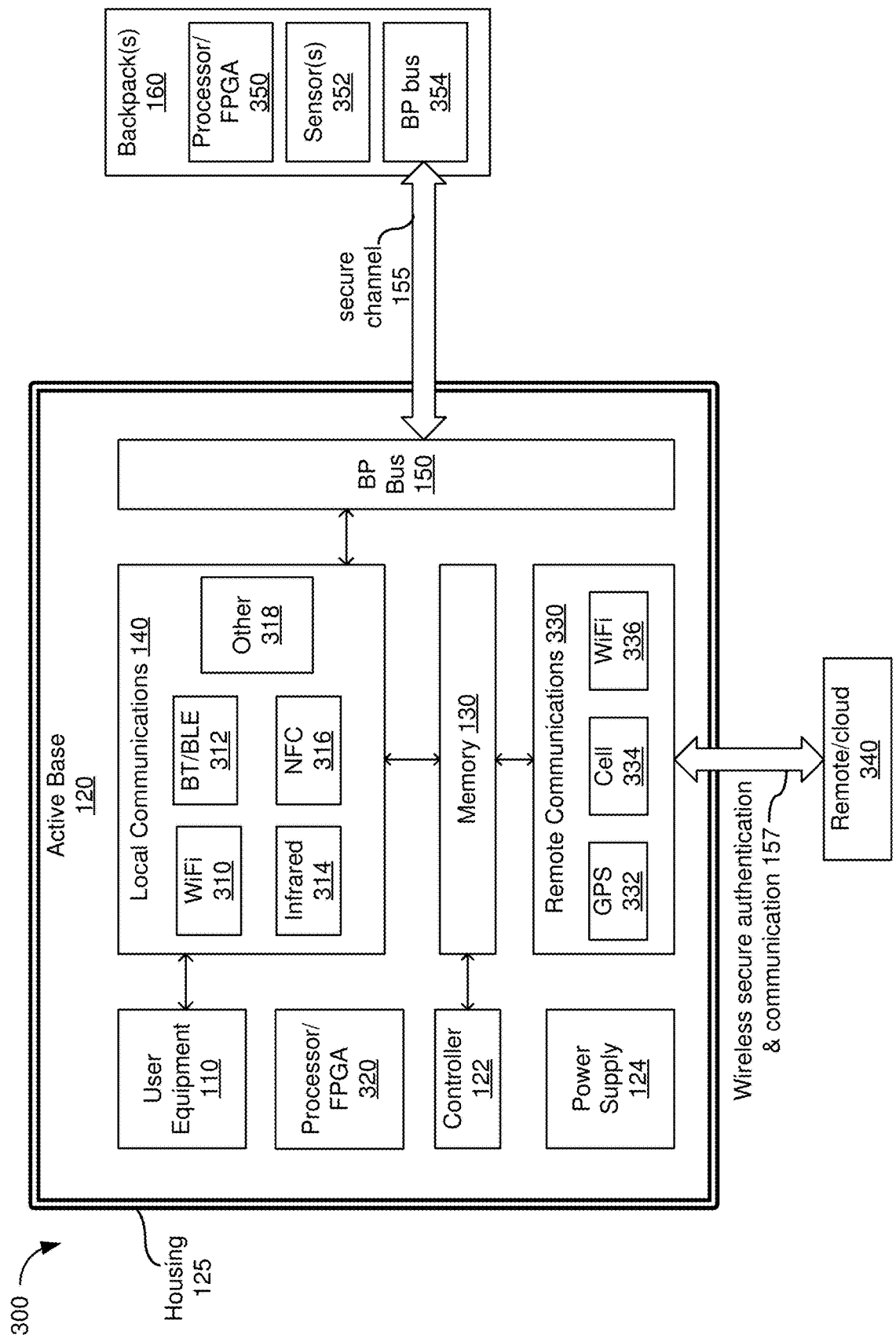
FIG. 3 is an illustration of an exemplary system comprising the apparatus enclosing the personal communication device in communication with backpack(s) and/or cloud in accordance with some embodiments.

The active base 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 1 or a whole enclosure encapsulating the personal communication device 110 as shown in FIG. 3.

When in the first position, the housing 125, along with other components of the active base 120, protects the personal communication device 110 against tracking or spying, e.g., by audio jamming, camera covering, and/or RF shielding, etc. When the one or more moveable components of the housing assembly are in a second position (e.g., a hood slid up), a user can take the personal communication device 110 out of the housing 125 and place the personal communication device 110 in a non-protected mode.

In some embodiments, the active base 120 includes a peripheral interface 150 (e.g., a backpack interface) to connect to a supplemental functional device 160 (e.g., a backpack). A supplemental functional device, as described herein, is a device connectable to the personal communication device 110 through the active base 120 and provides supplemental functions to the personal communication device 110.

The peripheral interface 150 connects the supplemental functional device 160 to the active base 120 and a local communication device 140 further connects the peripheral interface 150 to the personal communication device 110. As such, the peripheral interface 150 is a modular interface for the backpack 160, which is a detachable device that allows supplemental hardware and software functionalities to be provided to the user of the active base 120. The supplemental functional device 160 is further described below with reference to FIG. 3.

In some embodiments, the housing 125 at least partially supports the peripheral interface 150. For example, in an exemplary setting 200A of FIG. 2A, the peripheral interface 150 includes a number of connectors (e.g., contact pins or contact pads as indicated by the dots) connectable to the supplemental functional device 160. In some embodiments, the connectors are affixed to the housing 125 and at least partially supported by the housing 125, as shown in an exemplary setting 200B of FIG. 2B. The connectors are mateable to the interface of the supplemental functional device 160. In some embodiments, as shown in an exemplary setting 200C of FIG. 2C, the peripheral interface 150 is wholly supported by the housing 125, such that the peripheral interface 150 is integrated with or embedded in the housing 125 surface. In such embodiments, connectors from the supplemental functional device 160 can be plugged into the peripheral interface 150 in order to connect the supplemental functional device 160 to the active base 120.

In the embodiments shown in FIGS. 2B and 2C, the peripheral interface 150 is operable to communicate with the supplemental functional device 160 via a physical wired channel including communication connectors. The physical channel forms a secure channel 155 for communication between the active base 120 and the supplemental functional device 160 as shown in FIG. 1. In some embodiments, the physical channel is established after the active base 120 authenticates and/or validates the supplemental functional device 160, e.g., based on an identifier of the supplemental functional device 160.

It should be noted that though FIGS. 2A-2C illustrate the peripheral interface 150 with physical connectors that can provide wired connection, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the active base 120 can connect to a wireless communication enabled backpack device 160 through a wireless peripheral interface 150 or through a wireless modem of the local communication device 140. As such, a wireless communication enabled supplemental functional device 160 can communicate with the active base 120 without being in contact with the housing 125 or physically connected to the peripheral interface 150.

In some embodiments, the active base 120 includes a local communication device 140 coupled to the peripheral interface 150 and supported by the housing 125. In some embodiments, the local communication device 140 includes one or more personal communication device interface modems (e.g., a WiFi modem 310, a BT/BLE radio 312, an infrared radio 314, an NFC radio 316, a Lightning® (a registered trademark of Apple Inc., Cupertino, Calif.) connector, etc.) operable to provide a communication channel (e.g., wirelessly or via physical connection) between the peripheral interface 150 and the personal communication device 110.

In one direction, the communication channel carries information from the personal communication device 110 to the active base 120 for validation. In the other direction, the communication channel carries information from the supplemental functional device 160 via the peripheral interface 150 to the personal communication device 110 in order to supplement the functionality of the personal communication device 110.

In some embodiments, the active base 120 includes a controller 122 coupled to the peripheral interface 150 and the local communication device 140. Embodiments of the controller 122 include hardware, software, firmware, or a combination thereof. In some embodiments, the controller 122 is operable to manage the communication channel between the personal communication device 110 and the supplemental functional device 160 and through the local communication device 140 and the peripheral interface 150. In other words, the controller 122 manages a segment of the communication channel between the personal communication device 110 and the active base 120 through the management of the local communication device 140, and the controller 122 manages a segment of the communication channel between the active base 120 and the supplemental functional device 160 through the management of the peripheral interface 150. For example, through the segment of the communication channel between the active base 120 and the personal communication device 110, the controller 122 obtains an identifier of the personal communication device 110 and/or the user (e.g., obtaining biometric data). Thus, in some embodiments, the active base 120 authenticates the personal communication device 110 and/or the user and based on the authentication result, gates electronic signals to allow or deny the usage of the personal communication device 110. The communication between the supplemental functional device 160 and the personal communication device 110 under the management of the controller 122 is further described with reference to FIG. 3 below.

In addition to managing the communication channel, the controller 122 logs data in a secure area of the active base 120. Logging data in the secure area of the active base 120 has the advantage of providing trustworthy status reports of the personal communication device 110 for analysis in case the personal communication device 110 has been or potentially has been compromised. For example, many high-value enterprises invest significantly to implement tight monitoring and access control within their own networks, but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the active base 120 includes a power supply 124. The power supply 124 supplies power to the peripheral interface 150, the local communication device 140, and/or the controller 122. In some embodiments, the power supply 124 includes at least one of a battery, a charging socket, a USB connector, a power plug, and/or a power socket. In some embodiments, the power supply 124 includes a connector for a battery. Though not shown in FIG. 1, in some embodiments, the power supply 124 includes a plurality of power supplying components, e.g., one battery providing power to the peripheral interface 150, a power plug providing power to the local communication device 140 and/or the controller 122, etc. The plurality of power supply components can be connected to be charged together, charged separately, aggregating power to supply to one or more hardware electronic components of the active base 120, or separately providing power to one or more hardware electronic components of the active base 120.

It will be appreciated that the components, devices or elements illustrated in and described with respect to FIG. 1 may not be mandatory and thus some may be omitted in certain embodiments. Additionally, some embodiments can include further or different components, functions, devices, or elements beyond those illustrated in and described with respect to FIG. 1. For example, the controller 122 can comprise a plurality of controllers. A USB connector can be used as the power supply 124, as well as be a local communication device (e.g., part of the local communication device 140). In some embodiments, the USB connector includes a USB controller. In such embodiments, the controller 122 can include the main controller of the active base 120 as well as the USB controller. The plurality of controllers may communicate with each other and collectively perform one or more functionalities. In particular, the main controller can delegate certain tasks to sub controller(s). For example, upon receiving data over the USB interface, the USB controller can process the data and send the processed data to WiFi or other communication interface. Further, in some embodiments, the controller 122 can be configured to execute instructions that can be stored in the memory 130 or that can be otherwise accessible to the controller 122. As such, whether configured by hardware or by a combination of hardware, firmware, and software, the controller 122 is capable of performing operations according to various embodiments.

In some embodiments, the personal communication device 110 held by the active base 120 includes a processor 112, one or more communication devices 114, an input/output interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data.

In some embodiments, the processor 112 is coupled to the one or more communication devices 114 in order to control the communication using the one or more communication devices 114, in accordance with some embodiments. In addition to controlling communication, the processor 112 processes data and executes the applications 113, in accordance with some embodiments. In some embodiments, the processor 112 includes one or more chips and/or chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like.

Although illustrated as a single processor, it will be appreciated that the processor 112 can comprise a plurality of processors. The plurality of processors may communicate with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the input/output interface 116, the one or more communication devices 114, or the sensors 118, via a bus.

In some embodiments, the applications 113 stored in the memory 111 include an application for exchanging information between the personal communication device 110 and an external electronic device (e.g., the active base 120). The information exchange includes, for example, transmitting information obtained by the one or more communication devices 114 and/or sensors 118 to an external electronic device (e.g., the active base 120) or receiving information from the external electronic device, e.g., the information gathered by the supplemental functional device 160 and relayed by the active base 120 via the peripheral interface 150 and the local communication device 140.

In some embodiments, the input/output interface 116 provides a channel for input/output data between the processor 112 and input/output peripheral devices, such as a display, a keyboard, a mouse, a pen, microphones, cameras, and/or speakers of the personal communication device 110. In some embodiments, the peripheral devices are connected to the input/output interface 116 wirelessly, e.g., via the one or more communication devices 114.

In some embodiments, the one or more communication devices 114 connect the personal communication device 110 and an external electronic device wirelessly or through a wired connection. In some embodiments, the external electronic device is the active base 120, such that the one or more communication devices 114 connect to the active base 120 wirelessly or through a wired communication. The wireless communication includes at least one of, for example, WiFi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes the sensors 118, such as one or more accelerometers, gyroscopes, and/or magnetometers (e.g., as part of an inertial measurement unit (IMU)) for obtaining information concerning the position (e.g., altitude) of the personal communication device 110, light sensors, or acoustic sensors. In some embodiments, the sensors 118 are coupled to the input/output interface 116, such that the information collected by the sensors 118 are passed to the processor 112 by the input/output interface 116 for further processing. For example, the input device camera uses light sensors for light sensing.

In some embodiments, the sensors 118 are coupled to the one or more communication devices 114, such that the information collected by the sensors 118 is transmitted to another device (e.g., the active base 120) for validation. In some embodiments, the sensors 118 are coupled to the power supply (e.g., a battery) of the personal communication devices 110 for obtaining the power level of the personal communication devices 110.

Turning to FIG. 3, a block diagram of an exemplary system 300, which comprises the active base 120 enclosing the personal communication device 110 in communication with the supplemental functional device 160 and/or a remote secure validator in a cloud 340 through secure channels 155 and 157 in accordance with some embodiments. In some embodiments, the supplemental functional device 160 includes a processing element 350, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. In some embodiments, the supplemental functional device 160 includes sensors 352 to collect information.

The information collected by the sensor(s) 352 are processed by the processing element 350 and communicated to the peripheral interface (e.g., a backpack bus) 150 via the secure channel 155, e.g., through wired connection between the peripheral interface 150 and an interface 354 (e.g., a backpack bus) on the supplemental functional device 160. Upon receiving the information, the peripheral interface 150 sends the information to the local communication device 140 under the management of the controller 122, and the controller 122 further directs the information to the personal communication device 110. The additional information gathered by the supplemental functional device 160 supplements the functionality of the personal communication device 110. Moreover, in some embodiments, the active base 120 analyzes the additional information gathered by the supplemental functional device 160 and uses the information to further determine if the personal communication device 110 has been compromised.

In some embodiments, the local communication device 140 includes one or more personal communication device interface modems (e.g., a WiFi modem 310, a BT/BLE radio 312, an infrared radio 314, an NFC radio 316, a Lightning® (a registered trademark of Apple Inc., Cupertino, Calif.) connector, etc.) operable to provide a communication channel (e.g., wirelessly or via physical connection) between the peripheral interface 150 or the active base 120, and the personal communication device 110.

In some embodiments, information associated with the personal communication device 110 is transmitted to a remote secure validator 340 (e.g., a remote secure validator on a remote server or a private cloud) for further validation remotely. In such embodiments, the active base 120 includes a remote communication device 330 supported by the housing 125 to transmit the information associated with the user equipment to the remote secure validator 340. In some embodiments, the remote secure validator 340 is a trusted source, such that the communication channel between the remote communication device 330 and the remote secure validator 340 is authenticated and secure, e.g., the remote server 340 includes a database of devices and/or user identifications for authenticating the active base 120 and/or the user of the personal communication device 110. The remote communication device 330, in some embodiments, includes one or more wireless communication devices, such as a GPS module 332, a cellular communication module 334, and a WiFi radio 336.

The remote communication device 330 uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or WiFi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

Figure 4A:
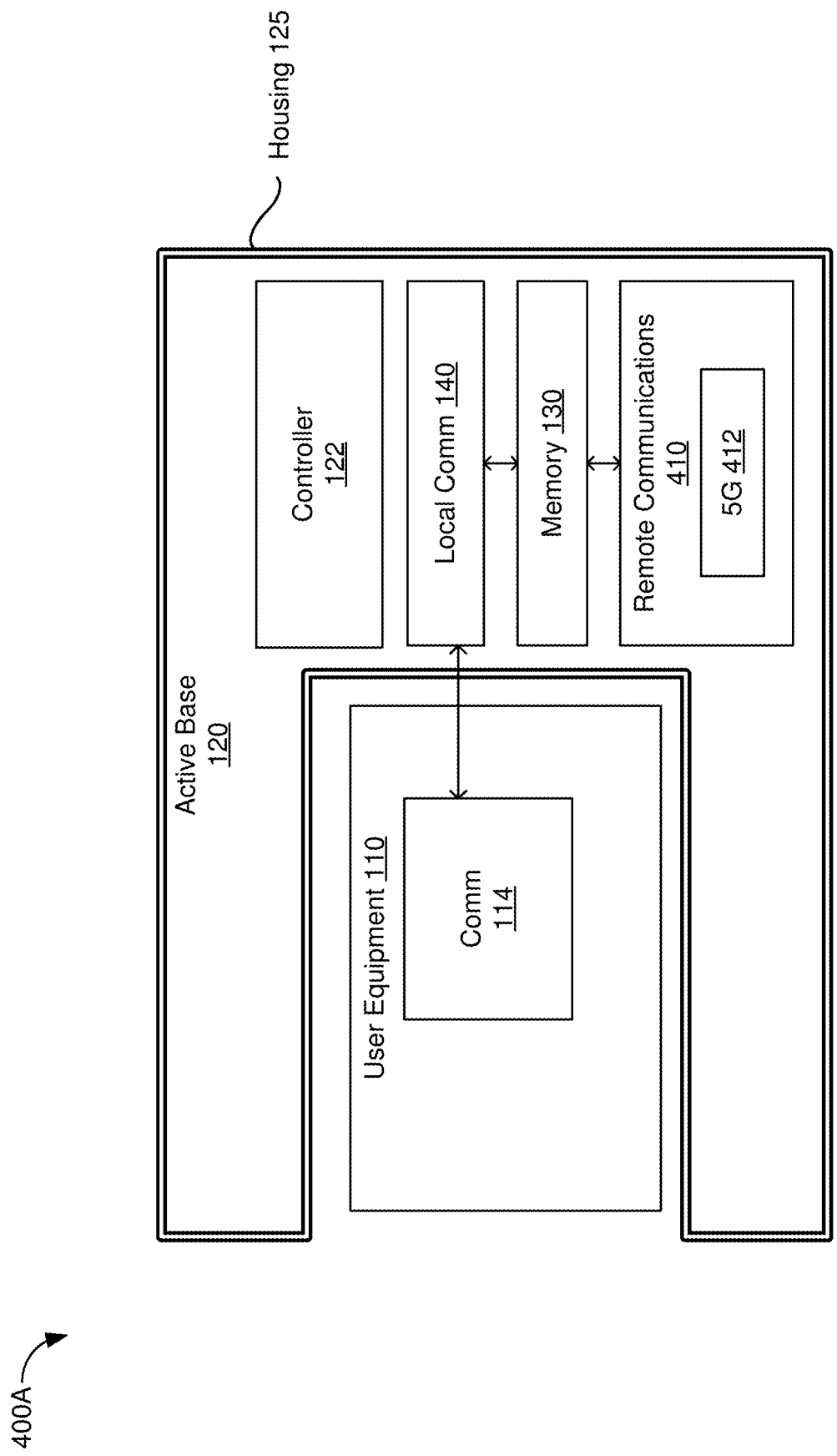
FIGS. 4A-4C are illustrations of exemplary remote communications devices in accordance with some embodiments.
Figure 4B:
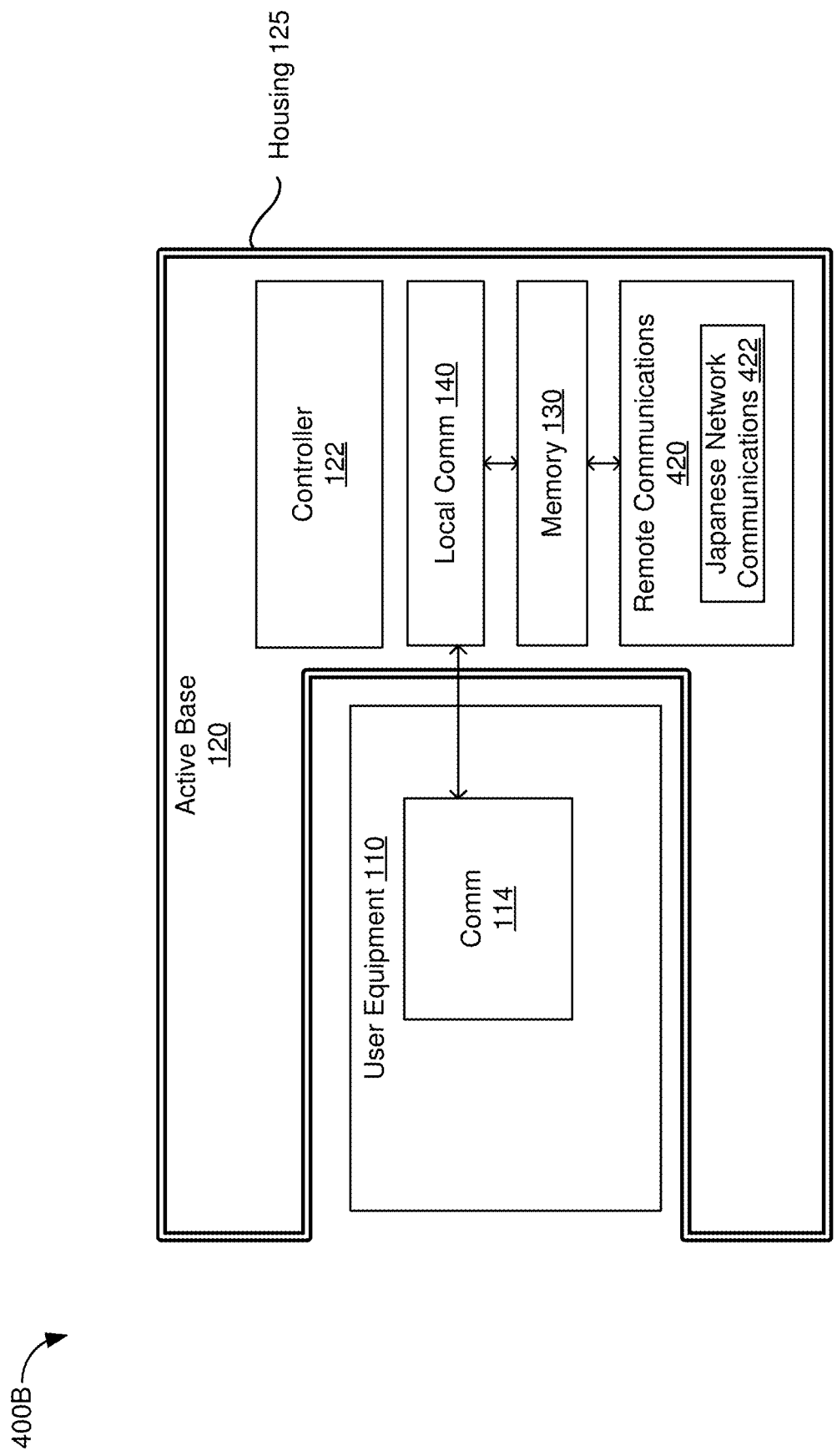
Figure 4C:
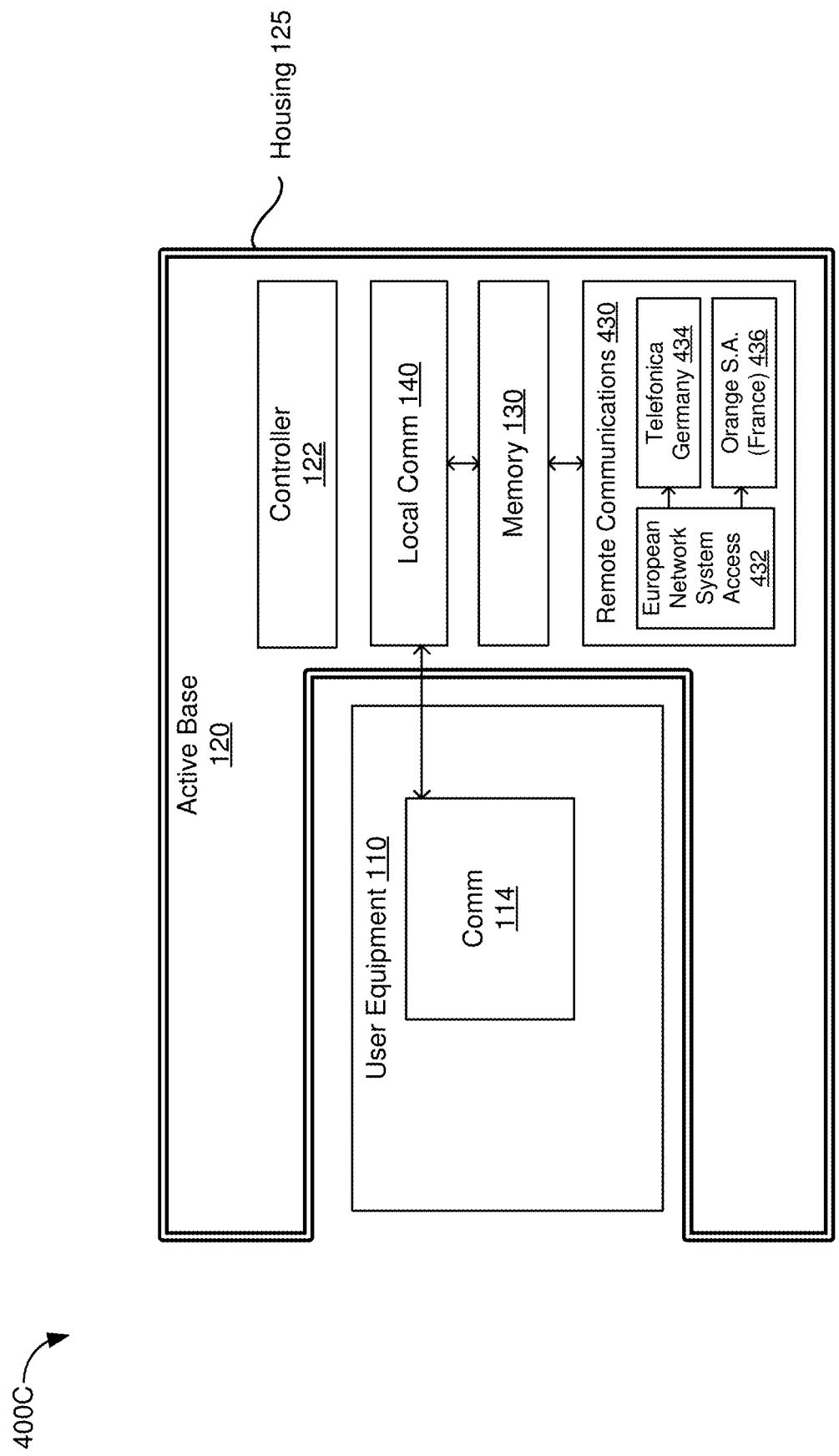

FIGS. 4A-4C are illustrations of exemplary systems 400A-400B that include remote communications devices 410, 420, and 430, in accordance with some embodiments. In FIG. 4A, the one or more remote communications devices 410 include, e.g., a 5G chip 412. The 5G chip 412 may provide 5G network communications capabilities to personal communication device 110. For example, personal communication device 110 may include a remote communication device that is part of the communication devices 114. The remote communication device, for example, is the same type as the 5G chip 412, e.g., a cellular communication chip with 2G capability. In other words, both the 5G chip 412 and the cellular communication chip are capable of the type of cellular communication. However, the remote communication device may be an older model or has not been updated, such that the remote communication device cannot communication with a 5G network. In some embodiments, the personal communication device 110 connects to 5G networks via the 5G chip 412 under the management of the active base 120. In order to connect to the 5G networks, the active base 120 uses the 5G chip 412 to exchange message with the 5G networks and relays the communication through the local communication channel between the local communication device 140 and the communication devices 114. Further, the active base 120 (e.g., the controller 122) may direct the personal communication device 110 to disable its remote communication capabilities (e.g., disabling one or more of the communication devices 114) upon detecting the presence of a 5G network. The 5G chip 412 may be one or more integrated circuits, antennas and microchips which enable 5G services. For example, the 5G chip 412 may include the 5G protocol stack in memory on one of the remote communications devices 410. In some embodiments, the 5G chip 412 may be present on the supplemental functional device 160 (not pictured) rather than the active base 120.

In another embodiment, in FIG. 4B, the remote communications device 420 may include, e.g., a Japanese network communications chip 422. Japanese network communications chip 422 may include capabilities for one or more country specific networks. For example, the Japanese network communications chip 422 may provide service for NTT DoCoMo, KDDI, Softbank Mobile, and/or Y!mobile. In this way, when a user travels to Japan they may insert their mobile device into the active base 120 and be able to use their mobile device on the new network. It would be appreciated by one in the art that these are exemplary embodiments for enabling greater and more flexible service for the personal communication device 110.

In some embodiments, a user may use the personal communication device 110 in conjunction with the remote communication devices 420 as shown and described in further detail below with reference to FIG. 6. For example, the controller 122 may receive a request for communication from the personal communication device 110. When the personal communication device 110 is not capable of performing network functions in Japan (e.g. the active base 120, while monitoring network activities associated with the personal communication device 110, detects a failed connection between the personal communication device 110 and a base station), the controller 122 may facilitate utilizing the Japanese network communications chip 422 to provide the alternative transport network function capabilities for the personal communication device 110. The controller 122 may then initiate communication for the Japanese network(s) (not shown). The controller 122 may then disable transport resources, such as a telecommunications chip of the communication devices 114 on the personal communication device 110, so that the remote communications device 420 provides the primary method of network communications and telephone services for the personal communication device 110. The controller 122 may then provide the communication data to the personal communication device 110 for display and/or processing.

In some embodiments, in addition to determining the communication capability of the phone, the controller 122 can also direct the personal communication device 110 to use or restrict certain native communication capabilities in order to use the alternative transport capability provided by the active base 120. For example, the controller 122 can direct the generation of a message for display on the personal communication device to ask the user to manually turn off certain transport, e.g., switching to airplane mode and/or confirming the phone is in the airplane mode. In another example, the controller 122 can direct the mobile device management software on the personal communication device 110 to control and/or restrict the phone's native transports, e.g., sinkholing cellular, blacklisting WiFi SSIDs and/or BLE connections, etc.

In another embodiment, in FIG. 4C, the remote communications device 430 may include one or more devices, such as a European network communication system access chip 432. The European network communication system access chip 432 may provide capabilities for one or more European services such as for Telefonica Germany 434 and/or Orange S.A. (France) 436. One skilled in the art would appreciate that these are merely exemplary system capabilities and any variety of one or more service functions may be provided. In one example, Telefonica Germany 434 may provide network services specific to a provider, such as Telefonica in Germany. Similarly, Orange S.A. (France) 436 may provide service capability for Orange™ in France. In an embodiment, a user may insert their personal communication device 110 into the active base 120 while in Europe and connect to a respective European network via the active base 120, e.g., even when their personal communication device 110 is brought from outside Europe. As such, the user may be able to use their own mobile device (possibly maintaining the same phone number) from their home region to communicate with the networks in a different country and/or region through the European network communication system access chip 432.

In another embodiment, the remote communications devices 410, 420, and 430 may provide local proximity data services. For example, the remote communications devices 410, 420, and 430 may include one or more chips providing nanoscale communications, NFC, body area network (BAN), personal area network (PAN) communication, near-me area network (NAN) communications, local area network (LAN) communication, metropolitan area network (MAN) communication, wide-area network (WAN) communication, internet area network (IAN) communications such as cloud, etc. In another embodiment, the capabilities of the one or more remote communications devices 410, 420, and 430 may be on the supplemental functional device 160 rather than the active base 120. As will be described in detail below with reference to FIG. 6, the remote communications devices 430 may perform all or part of the steps in FIG. 6 in conjunction with the controller 122.

Figure 5:
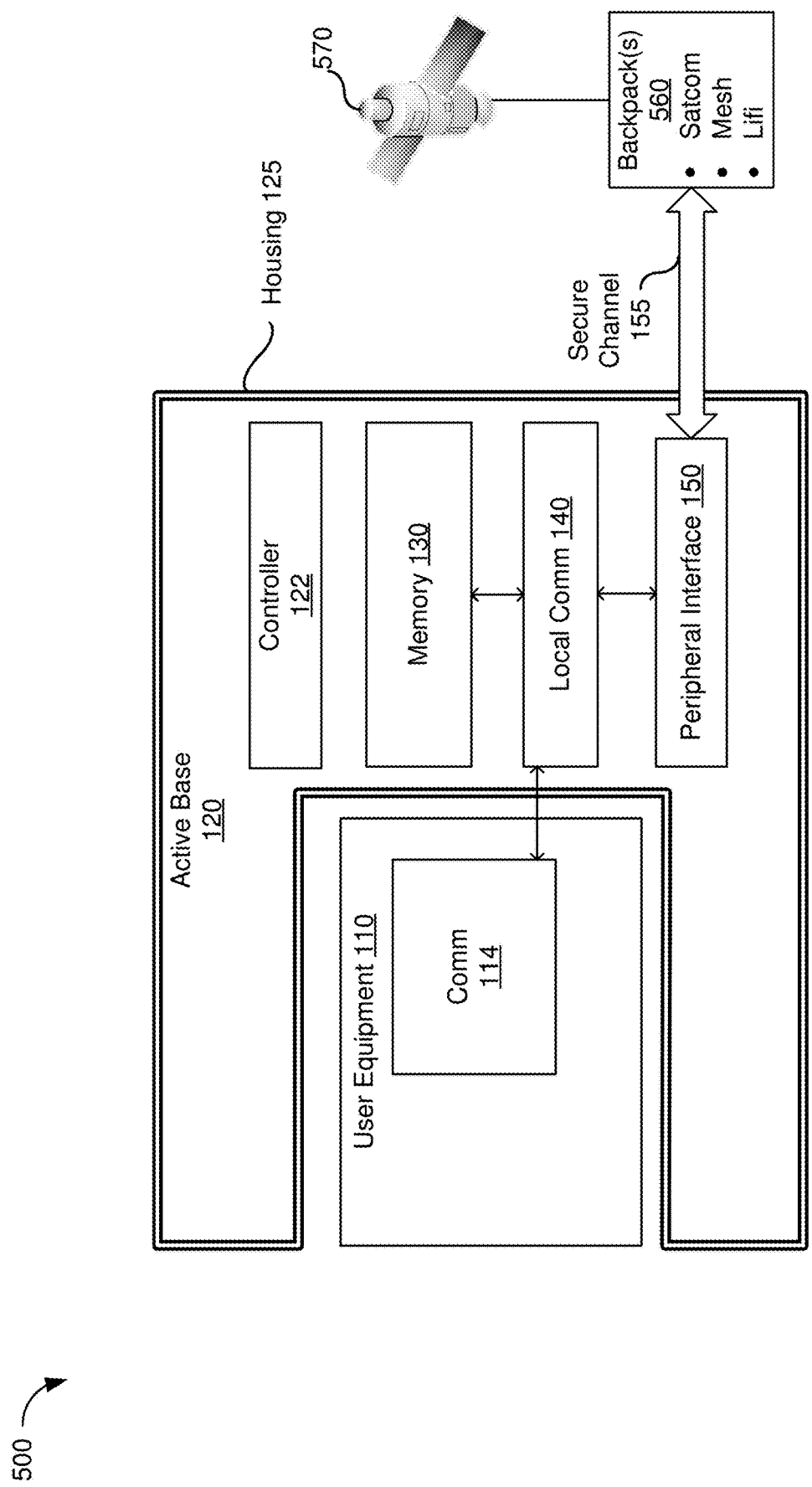
FIG. 5 is an illustration of an exemplary backpack in accordance with some embodiments.

FIG. 5 is an illustration of an exemplary communication system 500 including a supplemental functional device 560 in accordance with some embodiments. The supplemental functional device 560 may communicate with a satellite 570 in one embodiment. In another embodiment, the supplemental functional device 560 may enable communication with a mesh network (not shown). For example, the mesh network may be a packet radio network. In another embodiment, the supplemental functional device 560 may enable communication with a ZigBee network (not shown). In yet another embodiment, the supplemental functional device 560 may enable communication using light fidelity or Li-Fi. Using Li-Fi may provide hardware capabilities of using light-emitting diodes (LEDs) or the visible spectrum rather than a wireless radio. In another embodiment, the supplemental functional device 560 may enable infrared communication or Bluetooth™ capabilities. To that end, any part of the frequency spectra may be used to enable an alternative form of data communications for the personal communication device 110 via the active base 120 and/or the backpack 560.

For example, when the active base 120 actively monitors and analyzes the personal communication device 110, the active base 120 determines that the personal communication device 110 is not capable of communicating or cannot efficiently communicate with a remote source, e.g., an external device in a Satcom, Mesh, or Lifi network. In some instances, the personal communication device 110 may not have software, firmware, and/or hardware component to effectively communicate with the remote source (e.g., the satellite 570), e.g., a mobile device with 2G communication capability attempting to connect to a 5G network.

In some embodiments, the active base 120 further identifies one or more communication devices on the supplemental functional device 560 that are capable to communicate with the remote source. Moreover, in some embodiments, the active base 120 selects a communication device on the supplemental functional device 560 based on context and/or criteria, such as a user selection, the type of the remote source/communication protocol, etc. For example, the remote communication devices on the backpack 560 (or the active base 120) include a Satcom chip that is capable of a first type of communication, a Mesh chip that is capable of a second type of communication, and a Lifi chip that is capable of a third type of communication. Based on the type of Satellite 570 or the detected network (e.g., the type of communication protocol), the active base 120 selects a chip and enables a chip that can communicate with the remote source. In some embodiments, the establishment of the communication with the remote source is triggered by the active base 120 detecting a security breach on the personal communication device 110 or the active base 120 detecting a user selection indicating a preference of utilizing the alternative transport capabilities of the active base 120 and/or the supplemental functional device 560.

When utilizing the alternative transport capability of the supplemental functional device 560, through the secure channel 155, the active base 120 directs the supplemental functional device 560 to communicate with the satellite 570 and relays the messages between the personal communication device 110 and the supplemental functional device 560. In some embodiments, the active base 120 and/or the supplemental functional device 560 also perform protocol conversion, so that the personal communication device 110 can process the messages pursuant to the formal and/or protocol that the personal communication device 110 is capable of processing. As a result, without upgrading to new software, firmware, and/or hardware, the supplemental functional device 560 and the active base 120 provide alternative transport in data communication to the personal communication device 110.

In some embodiments, the active base 120 further processes the communication data in order to create output data, e.g., audio, video, and/or other forms data to be outputted to the personal communication device 110 for presentation or to be used by the operating system, application(s), and/or firmware of the personal communication device 110. As shown in FIG. 5, the communication channel between the supplemental function device 560 and the active base 120 is secure. Further as described above, the communication channel between the active base 120 and the personal communication device 110 is secure. In some embodiments, the processing on the communication data on the active base 120 and the data communication on the supplemental functional device 560 are performed simultaneously or in parallel to improve efficiency. As such, utilizing the supplemental communication capabilities provided by the supplemental functional device 560 and the alternative processing capabilities of the active base 120, the personal communication device 110 gains additional communication capabilities and can securely communicate with the remote source 570.

In some embodiments, the local communication channel (e.g., formed by pairing a local communication device on the user equipment 110 and a local communication device on the active base 120) between the personal communication device 110 and the active base 120 is secure and restricts access to authorized users and/or authorized user equipment 110, e.g., based on identifier(s) of the user equipment 110 and/or the user. Further, in some embodiments, the remote communications device 430 (FIGS. 4A-4C) and/or the communication devices on the supplemental functional device 560 communicate with a secure remote source (e.g., the secure cloud 340, or the Satellite 570, which is a trusted source). Thus, by disabling the remote communication capability of the personal communication device 110 and using the remote communication device on the active base 120 and/or the supplemental functional device 560, the active base 120 along with the supplemental functional device 560 enhances the security and communication capability of the personal communication device 110.

Figure 6:
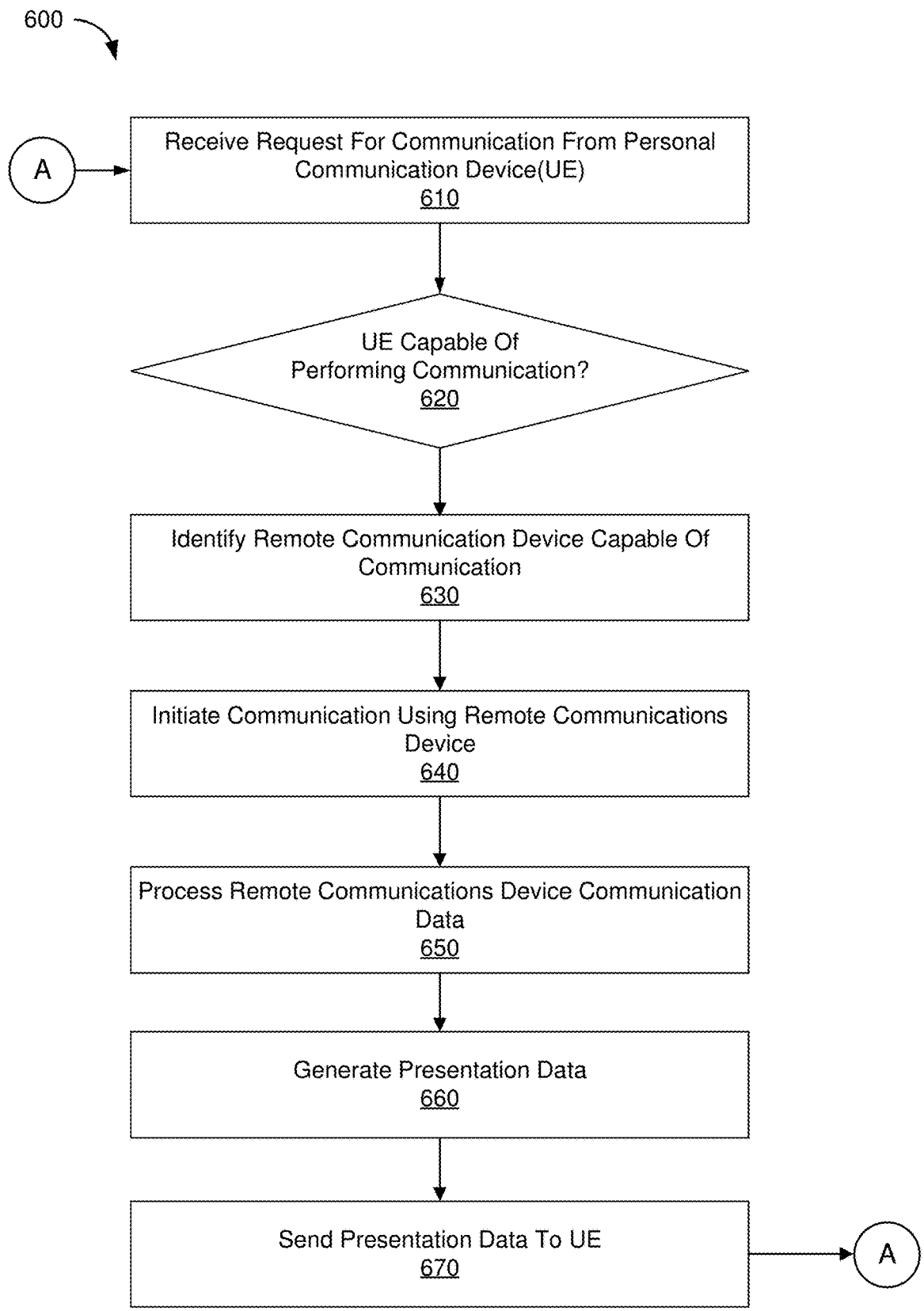
FIG. 6 is a flowchart illustrating a method of connecting an alternative transport for data communications for a personal communication device in accordance with some embodiments.

FIG. 6 is a flowchart illustrating a method 600 of providing alternative transport for data communications for a personal communication device (e.g., a second device) in accordance with some embodiments. In some embodiments, the method 600 may begin in step 610 where the controller 122 may receive a request in conjunction with the active base (i.e., first device) 120 for communication. For example, the controller 122 may receive a request identifying a capability type of communication. As may be appreciated, this may be any of the close proximity types of communication as well as the longer distance packeting or satellite communications discussed above. For example, the communication type may be NFC, BAN, PAN, NAN, LAN, MAN, WAN, IAN, satellite, etc.

The request for communication may be via wired or wireless means. For example, the first device may receive a request through the local communication device 140. In some embodiments the request may be direct to the first device, for example, when a radio communication type is present on the first device and not on the personal communication device 110. In another example, when a user plugs or inserts the second device (e.g., the phone 110, FIG. 1) into the first device (e.g., the active base 120, FIG. 1), a local communication channel is established through the USB connector of the phone 110 and the USB connector of the active base 120. As such, the active base 120 appears to be a communication interface to the phone 110, e.g., enabling communication according to IP over USB protocol through the active base 120. When the phone 110 initiates a type of communication, active base 120 (e.g., the controller 122 including a USB controller, FIG. 1) detects the request from the phone to initiate the communication over the USB interface and handles the request accordingly.

The method 600 may proceed next to step 620. In step 620 the first device may determine whether the personal communications device is capable of performing the specified communication type. In some embodiments, the controller 122 may use this information to determine whether to present the user with the option of using the first device-based communication or the personal communications device for communication. In other embodiments, the controller 122 may determine that both devices are capable and use both in parallel. For example, the same type of data communications standard may be used on both the user equipment as well as the first device. In yet another embodiment, the controller 122 may decide to disable the personal communications device radio. In another embodiment, the controller 122 may take into account security concerns to decide whether or not to enable one or more alternative paths of communication.

In step 630, the first device or the controller may identify the appropriate remote communication device as capable of communication. For example, there may be one or more remote communication devices on the first device, including one or more radios. The appropriate remote communication device may be identified for communication with one or more remote sources and the user equipment 110. In some embodiments, as explained above with reference to FIG. 1, the main controller of the active base 120 can delegate certain tasks to sub controller(s). For example, the main controller of the active base 120 can delegate the task of forwarding communication from a USB hub on the active base 120 to a USB controller of the USB hub. Alternatively, the main controller of the active base 120 oversees the local communication channel and facilitates the routing of the data from the USB hub to available alternative transports. As such, in some embodiments, upon receiving a communication initiation request from the user equipment 110 over the USB interface, the active base 120 identifies the type of available transport, and determines available transport to forward the request to, e.g., WiFi. When the USB controller receives the data over the USB interface, the USB controller processes the data and forwards the data to a WiFi chip on the active base 120 directly in accordance with some embodiments.

In step 640, the controller may initiate communication with the remote source via the remote communication device. Initiating communication may include sending and receiving according to the communication type of the remote communication device. In one example, the user equipment may have 4G capable circuits, while the remote communication device provides 5G capabilities. Therefore, the remote communication device may communicate in 5G in newer networks or areas. In another example, the remote communications device may provide network capabilities for European or Japanese networks. In some embodiments, the active base 120 includes a data converter under the management of the controller 122. The data converter not only converts data of the same type of communication, e.g., 4G to 5G, but also data of different types, e.g., between USB and WiFi, USB and cellular, and/or USB and Ethernet etc.

In step 650, the controller may process communication data from the remote communications device. The controller may use one or more local processors to communicate and process the data from remote communications device.

In step 660, the controller may generate one or more pieces or sets of output data. The output data may be audio, video, user interface data for presentation or data to be used by the operating system, firmware, or application(s) of the user equipment 110, etc. In step 670, the controller may send the output data to the user equipment 110 for display to the user.

The active base 120 performing the method 600 disclosed herein provides not only alternative communication path, but also enhanced security. For example, certain types of communication have two levels of encryption, e.g., two levels of encryptions through two tunnels. In case of virtual private network (VPN), this is often implemented with an external device to which a phone connects. A first tunnel is between the external device and a VPN endpoint (e.g., a VPN server). A second tunnel starts on the phone and passes through the first tunnel involving the second device. When communications between the phone and a remote source (e.g., a web server) passes through the first tunnel, the VPN endpoint can restrict certain communications between the phone and the remote source, e.g., restricting access to certain websites hosted by the web server.

In some embodiments, the active base 120 described herein can provide similar secure communication channels without relying on an external device. Specifically, in some embodiments, the active base 120 can initiate communication with a VPN endpoint to authorize the user of the user equipment 110. Further, upon successful authentication, the active base 120 can establish a secure communication channel (e.g., a VPN tunnel) between the active base 120 and the VPN endpoint. Further, communications between the user equipment 110 and a remote source would be encrypted and also routed through the active base 120. The active base 120 further transits such communications through the VPN tunnel to restrict access to information from the remote source, e.g., restricting access to a webpage or the recipient of a phone call or text message.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at an apparatus including a housing arranged to hold a personal communication device, the apparatus includes a controller, non-transitory memory, multiple remote communication devices, and a local communication device at least partially supported by the housing:
   receiving a request from the personal communication device via the local communication device to initiate a type of communication with a remote source;
   selecting a remote communication device from the multiple remote communication devices and enabling the remote communication device in response to receiving the request, wherein the remote communication device is capable of the type of communication between the remote source and the personal communication device;
   initiating the type of communication with the remote source using the remote communication device;
   processing communication data from the remote communication device to create output data; and
   sending, using the local communication device, to the personal communication device the output data.

2. The method of claim 1, further comprising:
   detecting that the personal communication device is not capable of performing the type of communication; and
   initiating the type of communication from the remote communication device when the personal communication device is not capable of performing the type of communication.

3. The method of claim 1, further comprising:
   detecting that the personal communication device is not capable of performing the type of communication; and
   disabling one or more communication devices of the personal communication device in order to restrict communication capabilities of the one or more communication devices of the personal communication device when the personal communication device is not capable of performing the type of communication.

4. The method of claim 3, further comprising generating a message to be presented to a user on a display of the personal communication with the option of disabling the one or more communication devices of the personal communication device.

5. The method of claim 1, further comprising, directing, by the controller, to activate the remote communication device in response to detecting a security breach on the personal communication device.

6. The method of claim 1, wherein:
   initiating the type of communication with the remote source using the remote communication device includes establishing, using the remote communication device, a first tunnel with a virtual private network (VPN) endpoint; and
   processing the communication data from the remote communication device to create the output data includes transiting the communication data through the first tunnel, including restricting access to the communication data from the remote source.

7. The method of claim 6, further comprising:
   establishing a second tunnel between the personal communication device and the remote source by generating encrypted communication data based on the communication data; and
   transiting the encrypted communication data between the personal communication device and the remote source through the first tunnel and the second tunnel.

8. The method of claim 7, wherein the controller manages the the first tunnel and the second tunnel between the apparatus and the personal communication device.

9. The method of claim 1, wherein the remote communication device is included in the apparatus or is included in a third device attached to the housing of the apparatus.

10. The method of claim 1, wherein selecting the remote communication device from the multiple remote communication devices includes selecting the remote communication device from the multiple remote communication devices based on the type of communication.

11. An apparatus comprising:
    a housing arranged to hold a personal communication device;
    a local communication device, at least partially supported by the housing and connectable to the personal communication device, operable to receive a request from the personal communication device for a type of communication with a remote source;
    multiple remote communication devices that are at least partially supported by the housing; and a controller, coupled to the local communication device and the multiple remote communication devices, operable to select a remote communication device from the multiple remote communication devices and enable the remote communication device in response to receiving the request, wherein the remote communication device is capable of the type of communication between the remote source and the personal communication device and, initiate the type of communication to the remote source using the remote communication device, process communication data from the remote communication device in order to create output data, and instruct the local communication device to send the output data to the personal communication device.

12. The apparatus of claim 11, further comprising a peripheral interface at least partially supported by the housing, wherein the peripheral interface is connectable to a supplemental functional device that includes the remote communication device.

13. The apparatus of claim 11, wherein the controller is further operable to:

determine that the personal communication device is not capable of performing the type of communication; and initiate of the type of communication from the remote communication device when the personal communication device is not capable of performing the type of communication.

14. The apparatus of claim 11, wherein the remote communication device is the same type as a communication device on the personal communication device, and the communication device on the personal communication device is disabled.

15. The apparatus of claim 14, wherein the controller is further operable to obtain an input from a user disabling the communication device on the personal communication device.

16. The apparatus of claim 11, wherein the output data includes one or more of audio or video data to be presented on the personal communication device.

17. The apparatus of claim 11, wherein the controller is further operable to activate the remote communication device in response to detecting a security breach on the personal communication device.

18. The apparatus of claim 11, wherein the local communication device forms part of a secure communication channel between the apparatus and the personal communication device to restrict access to authorized users.

19. The apparatus of claim 18, wherein the controller is further operable to manage the secure communication channel between the apparatus and the personal communication device.

20. The apparatus of claim 11, wherein the remote communication device comprises one or more of a Bluetooth Low Energy-capable circuit, a WiFi-capable circuit, a Satcom-capable circuit, or a Lifi-capable circuit.

* * * * *